United States Patent [19]

Hayashi et al.

[11] Patent Number: 4,671,759
[45] Date of Patent: Jun. 9, 1987

[54] APPARATUS FOR CONTINUOUSLY PRODUCING FILLED DOUGH PIECES

[76] Inventors: Torahiko Hayashi, 3-4, Nozawa-machi, Utsunomiya-shi, Tochigi-ken; Sadao Shibata, 1740-7, Tsuruta-machi, Utsunomiya-shi, Tochigi-ken, both of Japan

[21] Appl. No.: 787,618

[22] Filed: Oct. 15, 1985

[30] Foreign Application Priority Data

Oct. 12, 1984 [JP] Japan ................. 59-214888

[51] Int. Cl.⁴ .................. A21C 11/00; A21C 3/00
[52] U.S. Cl. .................. 425/294; 99/450.7; 425/316; 426/503
[58] Field of Search ............ 425/220, 312, 237, 233, 425/101, 235, 297, 306, 337, 310, 217, 316, 96, 298, 238, 316, 314; 264/140; 426/503; 99/450.7, 450.6, 353

[56] References Cited
U.S. PATENT DOCUMENTS 3,759,650  9/1973  Griner et al. ............ 425/316
4,120,627 10/1978  Alie ...................... 425/101
4,528,900  7/1985  Simelunas ............... 425/133.1
4,574,690  3/1986  Chao et al. .............. 426/308

FOREIGN PATENT DOCUMENTS 44-1169  1/1969  Japan .

Primary Examiner—Jay H. Woo
Assistant Examiner—Mataline Dillard
Attorney, Agent, or Firm—Guy W. Shoop

[57] ABSTRACT

An apparatus and method for continuously producing filled dough pieces is provided. A pair of toothed rotary disc cutters are arranged on a conveyor belt feeding a filled cylindrical dough body. A plurality of dividers mounted on the periphery of a wheel are disposed between and above the teeth. The dividers and the teeth rotate about their own axes to flatten the cylindrical dough body and to split it by their cooperatively synchronized movement whereby completely incrusted spherical or variously shaped filled dough pieces are produced.

3 Claims, 6 Drawing Figures

APPARATUS FOR CONTINUOUSLY PRODUCING FILLED DOUGH PIECES

BACKGROUND OF THE INVENTION

1. Field of the Invention

The present invention relates to an apparatus and method for continuously producing filled dough pieces from a continuously fed filled cylindrical dough body, and particularly to an apparatus and method for continuously producing separate filled dough pieces of a desired shape without exposing the filler by cutting the continuously fed filled cylindrical dough body into pieces.

2. Description of Prior Art

Japanese Patent Publication No. 1169/69 discloses a confectionery molder where oppositely positioned toothed plates, each having two converging faces to form a tooth, cut a bar-shaped filled dough body conveyed on a conveyor belt, and then the upper toothed plates sway laterally to roll divided dough pieces in the space surrounded by the adjacent teeth to form spherical filler-containing dough pieces. Although this apparatus can make ball-shaped filled dough pieces, it requires a complex mechanism and the filler is liable to be exposed when the toothed plates cut the bar-shaped filler-containing dough body.

In this invention, dividers, each having a cutting edge, constrict the filled cylindrical dough body cooperatively with a pair of rotary disc cutters which cut the narrowed dough portion containing no filler, so that perfectly incrusted spherical dough pieces are produced without exposing the filler.

SUMMARY OF THE INVENTION

It is an object of the present invention to provide an apparatus and method for continuously producing filled dough pieces.

It is another object of the present invention to provide an apparatus and method for continuously cutting a filled cylindrical dough body, which is continuously conveyed, to make spherical or variously shaped dough pieces, the filler of which is completely incrusted by the outer material.

It is a further object of the present invention to provide an apparatus and method for continuously cutting a filled cylindrical dough body, which is continuously conveyed, by which the filled cylindrical dough body is cut in a simple and reliable process to form separate spherical or variously shaped dough pieces consisting of a filler incrusted by the outer material.

In one aspect of the present invention, an apparatus for continuously producing filled dough pieces from a filled cylindrical dough body is provided, comprising a conveyor belt; a pair of rotary disc cutters oppositely and horizontally arranged on the conveyor belt and synchronously driven in opposite directions, each of the rotary disc cutters being formed with a plurality of teeth at predetermined intervals at its periphery, each of the teeth of a rotary disc cutter arranged to periodically contact the corresponding tooth of the other rotary disc cutter in operation; and a plurality of dividers, which are positioned between and above the pair of cutters, and disposed at predetermined intervals on the periphery of a circle arranged to rotate about a horizontal shaft perpendicular to the direction of movement of the conveyor, each divider being adapted to engage a tooth of each of the rotary disc cutters for a distance sufficient to form a filled dough piece.

In another aspect of the present invention, a method of continuously producing filled dough pieces from a filled cylindrical dough body is provided, comprising constricting at every interval a portion of the filled cylindrical dough body, while being fed on a conveyor belt, to make a flattened portion which is almost exclusively composed of an outer layer, and, while maintaining the height of the flattened portion, laterally narrowing the length thereof to cut the filled cylindrical dough body into separate filled dough pieces of a desired shape.

The apparatus of the invention has a conveyor belt, a pair of rotary disc cutters disposed on the belt, and a plurality of dividers which are positioned between and above the cutters.

The divider constricts and flattens a poriton of the filled cylindrical dough body. The cutting edge of the divider may preferably be blunt and it presses the cylindrical dough body to flatten it until the outer layer is flattened and the filler is removed from the area. The dough body is then narrowed and cut from both sides by a pair of disc cutters disposed beneath the dividers.

The dividers may be radially mounted on the periphery of a wheel. They periodically cut the cylindrical dough body. By changing the space between the dividers at the periphery of the wheel, for example, filled dough pieces of a different length can be produced.

Furthermore, flattening the dough body by the divider and narrowing the flattened dough portion by a pair of rotary disc cutters are carried out in synchronism in such a manner that, when a certain divider presses the cylindrical dough body to a predetermined height, the cutters can compress, narrow, and cut the flattened dough portion which is composed almost exclusively of the outer material, thereby cutting the cylindrical dough body into separate spherical or variously shaped or dimensioned incrusted dough pieces.

DESCRIPTION OF THE PREFERRED EMBODIMENT

An embodiment of the present invention will now be described with reference to the drawings.

Figure 1:
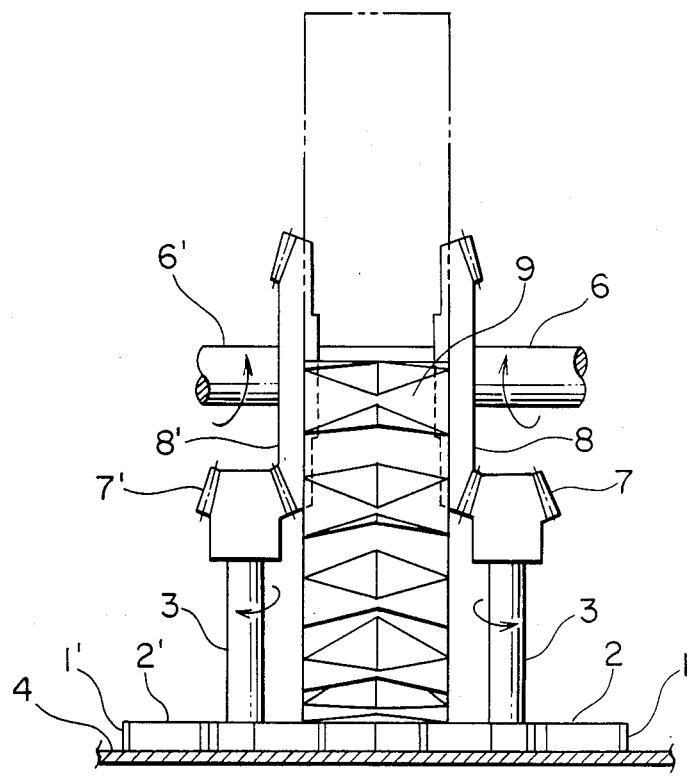
FIG. 1 is an elevational view of an embodiment of the present invention.

In FIG. 1, a pair of rotary disc cutters 2 and 2' are disposed slidably on a conveyor belt 4.

Figure 4A:
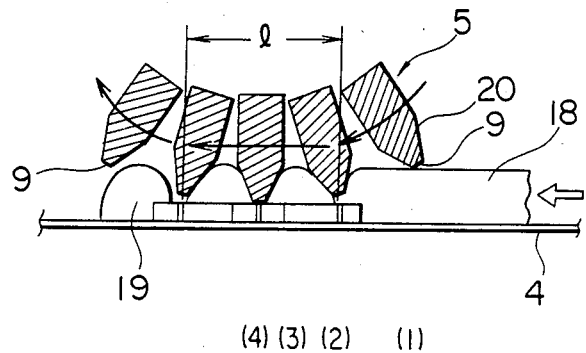
FIG. 4(A) is a side elevational view of the dividers in cross-section and the cutter of an embodiment of the present invention showing the function of the dividers.
Figure 4B:
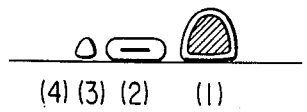
FIG. 4(B) illustrates cross-sectional views of the cylindrical dough body at points corresponding to points (1), (2), (3), and (4) of FIG. 4(A).
Figure 4C:
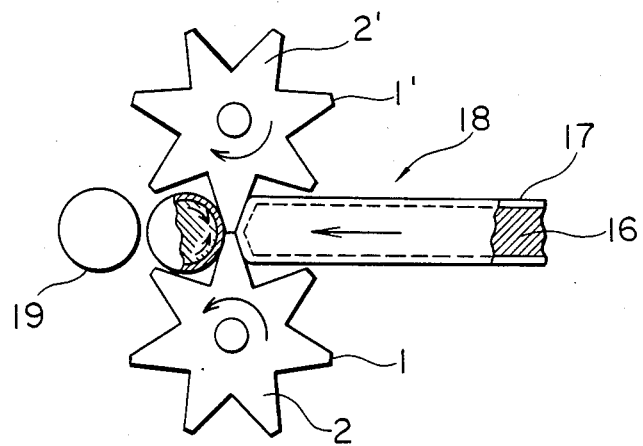
FIG. 4(C) is a plan view of a pair of rotary disc cutters of an embodiment of the present invention showing the function of the cutters.

The cutters have a plurality of teeth 1 and 1', as seen in FIG. 4(C), to compress, narrow, and cut the dough and are located opposite to each other and adapted to be synchronously driven in opposite directions. The rotation of the cutters is carried out through rotary shafts 3 and 3', bevel gears 7, 8, and 7',8' and by rotary shafts 6 and 6'.

The teeth are provided at predetermined intervals circumferentially of the rotary disc cutters and adapted periodically to be in contact with each other to cut the dough at the middle of the belt 4.

Each of cutters 2 and 2' has upper and lower flat surfaces and a predetermined thickness, preferably slightly less than double the thickness of the outer layer 17 of the dough body 18. The cutters rotate at the same angular velocity to cut the dough and produce incrusted filled dough pieces in cooperation with the dividers 5.

Figure 2:
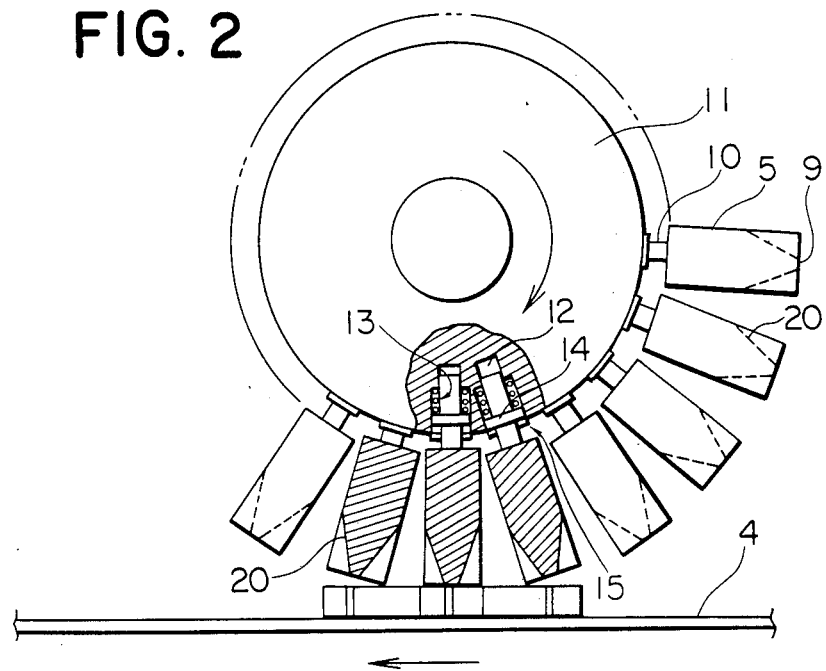
FIG. 2 is a side elevational view, partly in cross-section, of an embodiment of the present invention.
Figure 3:
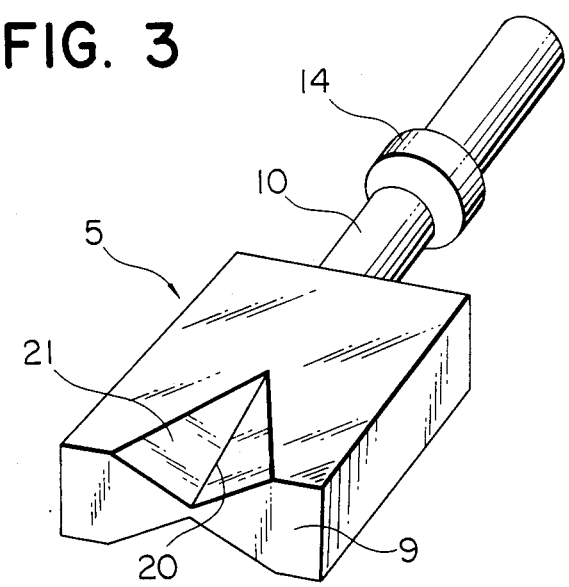
FIG. 3 is a perspective view of a divider of an embodiment of the present invention.

FIG. 2 shows a plurality of dividers 5 and a wheel 11 to support the same and shows the positional relationship between the upper flat surfaces of the rotary disc cutters 2 and 2' and the flat faces 9 of the dividers 5. A perspective view of the divider 5 is shown in FIG. 3. The divider consists of a rectangular body. The outermost end surface 9 is flat and slidably engages the teeth 1 and 1' of the cutters 2 and 2' when they come into contact with each other. The opposite end of the divider 5 is provided with a rod 10, circular in cross-section, with a protruding ring 14. A recess 21 is provided straddling the outermost end surface 9 and the leading surface, and another recess 21 is formed straddling the outermost end surface and the trailing surface of the divider 5, in such a manner that the middle portion of the outermost end surface is the narrowest.

An example of the recess 21 is shown in FIG. 3. It forms a triangular indent on each of the adjoining outermost end and the leading or trailing end surfaces, and constitutes two faces of an imaginary tetrahedron. The edge between the two faces is indicated by a line 20. This recess is designed to accomodate the portion of the dough body protruding above the cutters 2 and 2' when the dough is fed to the cutting area. The shape of the recess can be changed to respond to the configuration of the desired filled dough pieces.

The rod 10 is adapted to be loosely fitted in one of the holes 12 radially bored in the periphery of the wheel 11 at predetermined intervals. The hole 12 may be circular in cross-section and has a circular shoulder near the inward end. The diameter of the hole inside the shoulder is smaller than the remainder. A coil spring 13 is provided between the rod 10 and the hole 12 and is held between the shoulder of the hole 12 and the ring 14 of the rod 10. A stopper 15 is provided at the outer end of the hole 12 and engages the ring 14 positioned within the hole so that the rod 10 may not leave the hole 12 by the rotation of the wheel or by the pressure of the spring member 13. Therefore, the dividers 5 can be pressed in the radial direction of the wheel 11 or restored to its original position depending on the pressure externally applied.

The position of the wheel 11 is so arranged that the flat face 9 of the divider 5 is in contact with the teeth 1 and 1' of the cutters 2 and 2' for a distance l (shown in FIG. 4(B); also see FIG. 2), while the dividers 5 rotate around the axis of the wheel 11 in the clockwise direction in FIG. 2, as shown by a curved arrow. For the distance l the devider 5 moves in the horizontal direction. The bottom of the recess 20 is shown by broken lines in FIG. 2.

The filled cylindrical dough body 18 is conveyed on the belt 4 in the direction shown by an arrow under the belt 4 in FIG. 2 and enters between the divider and the belt and simultaneously enters between the cutters. The rotation of the divider is so synchronized with the rotation of the cutters that when the flat face 9 of the divider 5 approaches its lowest position, the flat face 9 of the divider 5 contacts the teeth 1 and 1' of the cutters 2 and 2'. When the wheel 11 further rotates, the divider 5 is pushed in the direction of the center of the wheel 11 against the spring 13. When the divider 5 reaches the bottom of the wheel 11, the spring 13 is compressed to the greatest degree. At that time, the teeth 1 and 1' also contact each other.

Turning now to the operation of the invention, the filled cylindrical dough body 18 conveyed on the belt 4 enters between the dividers 5 and the belt 4 and between the cutters 2 and 2'. Along with the progress of the dough body 18, a divider 5 gradually compresses the dough from above, while the cutters 2 and 2' squeeze the dough from both sides. The relationships of the movements of the dough, the cutters and the divider are illustrated in FIG. 4. The point at which the divider 5 comes into contact with the dough 18 is shown by the reference number (1) in FIG. 4(A). At this point, the cross-section of the dough is as shown in FIG. 4(B) by the reference number (1). when the divider moves to point (2), the teeth 1 and 1' of the cutters 2 and 2' touch the dough. At this point, an edge of the divider 5 comes into contact with the upper surface of the teeth 1 and 1', and the shape of the dough in cross-section is as shown in FIG. 4(B) by the reference number (2). The filler is almost completely excluded from the area. When the divider 5 moves a little further, the middle portion of the flat surface 9 comes into contact with the teeth 1 and ' and the dough is pressed to the height of the teeth. At this stage, the dough has a cross-section as shown in FIG. 4(B) by the reference number (3), where no filler is present and is composed only of the outer material 17. Since the portion of the dough that is compressed by the divider 5 is free of the filler, the teeth 1 and 1' can cut the dough without causing the filler to spill. When the flat face 9 of the divider 5 comes to the bottom of the wheel 11, the teeth 1 and 1' engage each other, and the divider is most strongly pressed against the teeth by the force of the spring 13. These positional relationships are shown by the reference number (4) in FIG. 4(A) as viewed from a side and in FIG. 4(C) as viewed from above. At this time, a portion of the cylindrical dough body is separated at its foremost end, and both the trailing half of the separated portion and the leading end of the remaining cylindrical dough body are completely covered with the outer material 17. It is evident from the above that by the next cutting cycle a second dough piece completely covered with the outer material is produced. A filled dough piece 19 as produced is shown in FIG. 4(A) and 4(C).

The separation of dough pieces from the cylindrical dough body without exposing the filler is facilitated by the mechanism where the flat face 9 of the divider 5, while rotating around the axis of the wheel 11 and in contact with the teeth 1 and 1' of the cutters 2 and 2', compresses the portion of the cylindrical dough body where it is cut for a certain distance. The number of the divider or the tooth, their dimensions and intervals, and the speed of rotation may be changed to respond to the required dimensions of the filled dough pieces desired, the production rate, and so forth. The tensility of the outer material of the cylindrical dough body to be cut should be taken into consideration in working the invention. If the outer material is very tensile so that it can readily stretch and shrink, such as rice-cake dough or bread dough, the divider can compress it more than the other types of dough, so that the height of the cutters 2 and 2' can be minimal.

According to the present invention, a continuously fed filled cylindrical dough body is compressed from above at the portion where it is cut to the extent that the filler is almost completely excluded from the compressed area, and then cut by oppositely arranged teeth of the cutters, thereby to cut the dough into perfectly incrusted filled dough pieces of a desired shape.

Also, no exposure of the filler is observed when constricting, flattening, and splitting the cylindrical dough body, and spherical or variously shaped filled dough pieces can be successively produced without requiring a complex mechanism.

We claim:

1. An apparatus for continuously producing filled dough pieces from a continuously fed filled cylindrical dough body, comprising a conveyor belt; a pair of rotary disc cutters oppositely and horizontally arranged on the conveyor belt and synchronously driven in opposite directions, each of the rotary disc cutters being formed with a plurality of teeth at predetermined intervals at its periphery, each of the teeth of a rotary disc cutter arranged to periodically contact the corresponding tooth of the other rotary disc cutter in operation; and a plurality of dividers, which are positioned between and above the pair of cutters, and disposed at predetermined intervals on the periphery of a circle arranged to rotate about a horizontal shaft perpendicular to the direction of movement of the conveyor, each divider being adapted to engage a tooth of each of the rotary disc cutters for a distance sufficient to form a filled dough piece.

2. An apparatus of claim 1, characterized in that the dividers are mounted at regular intervals, on the periphery of a wheel so that each of said dividers is biased away from the wheel by a spring member.

3. An apparatus of claim 1 characterized in that each divider is a rectangular body with a recess at its outermost end on each of the leading and trailing surfaces and in such a form as to receive the dough body when a portion thereof is constricted, leaving a relatively narrow end portion for the constriction.

* * * * *